Dec. 30, 1969     A. B. MOJONNIER ETAL     3,487,139
METHOD OF FORMING PLASTIC ARTICLES
Filed May 25, 1967     2 Sheets-Sheet 1
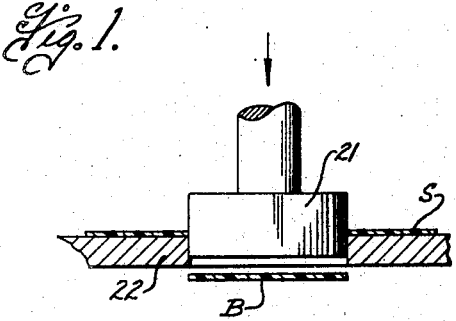
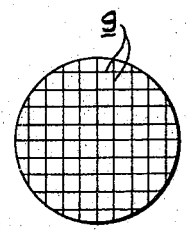
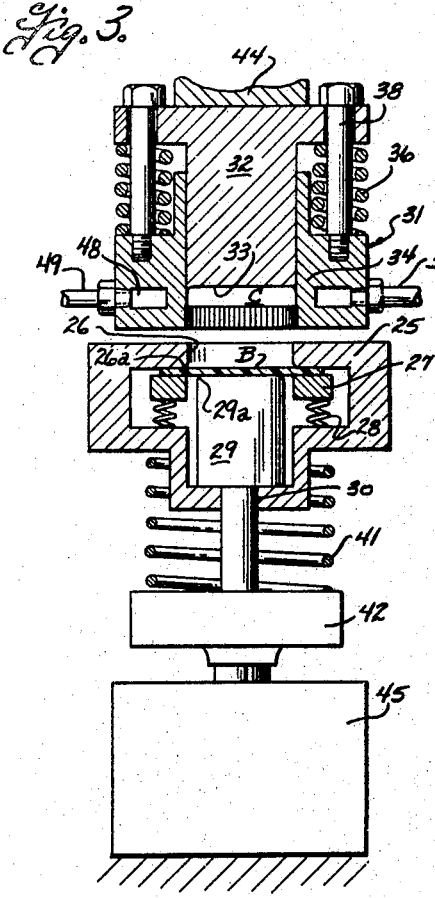
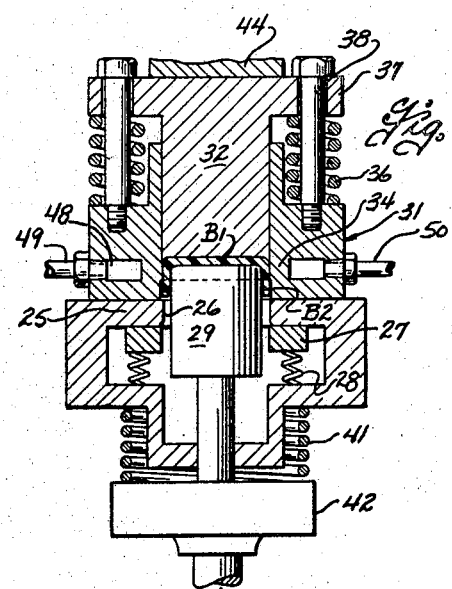
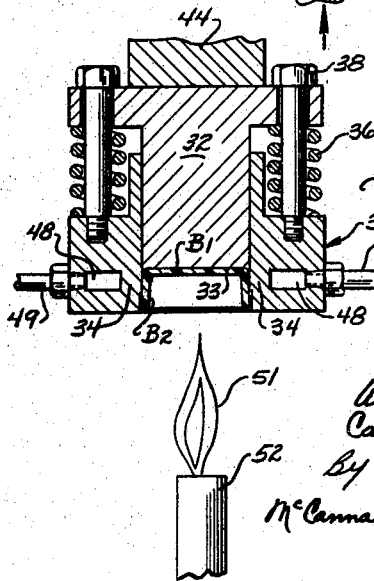
Inventors
Albert B. Mojonnier
Carl Ayala
By
McCanna, Morsbach & Pillote
Attorneys

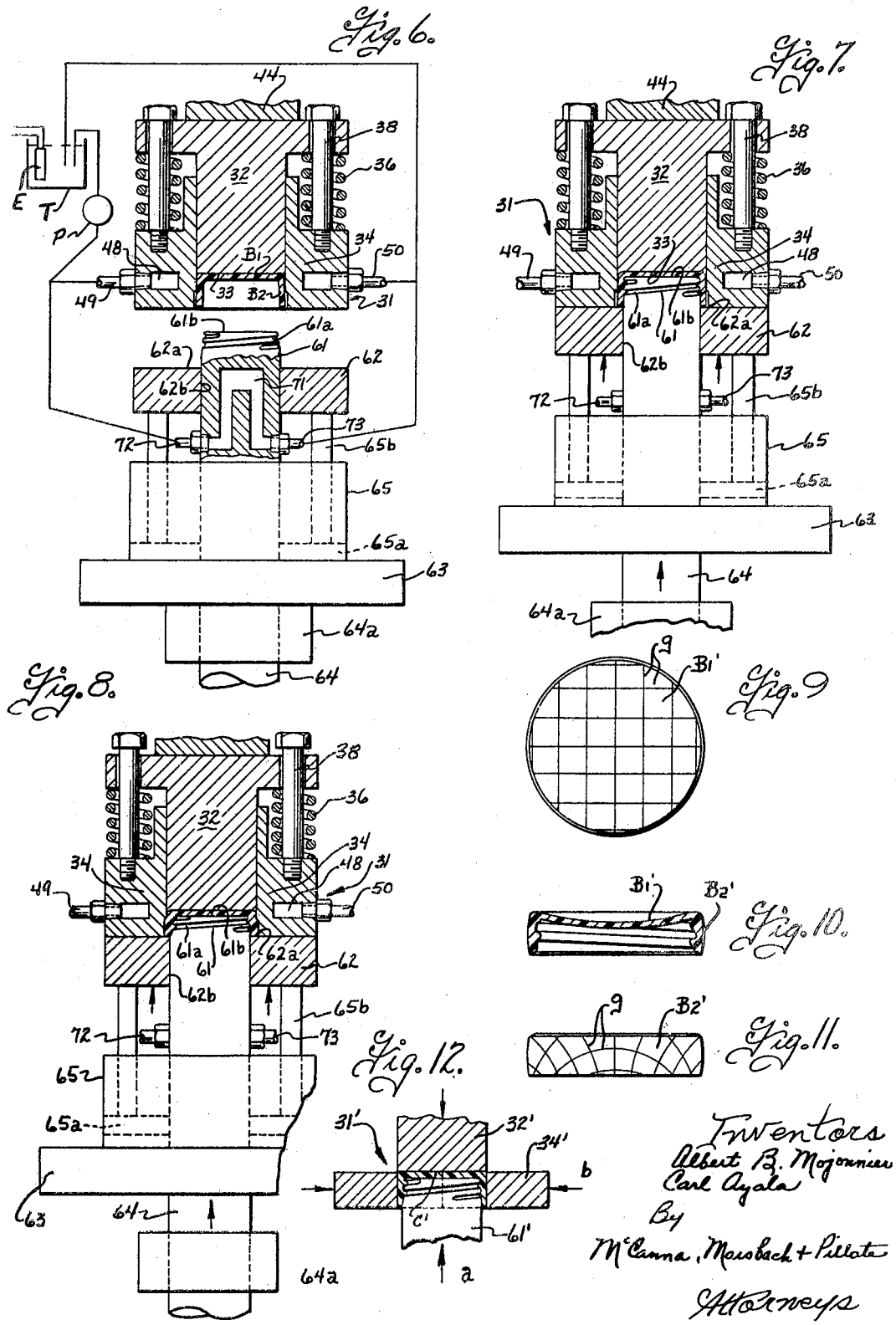

United States Patent Office 3,487,139
Patented Dec. 30, 1969

3,487,139
METHOD OF FORMING PLASTIC ARTICLES
Albert B. Mojonnier and Carl Ayala, Chicago, Ill., assignors to Albert Mojonnier, Inc., Franklin Park, Ill., a corporation of Illinois
Filed May 25, 1967, Ser. No. 641,351
Int. Cl. B29g 7/00; B29d 3/00, 31/00
U.S. Cl. 264—132                           16 Claims

ABSTRACT OF THE DISCLOSURE

The method relates to forming of dished or cup-shaped plastic articles, for example bottle caps, and involves cold-forming a piece of cold-formable thermoplastic material into a body having a shape generally similar to the desired shape of the article; heating the cold-formed body sufficient to partially soften the same, and thereafter shaping and setting the heat-softened body by pressing the same into conformity with a shaping mold.

---

Various different techniques including thermoforming of sheet material, injection molding and compression molding have heretofore been used in forming plastic articles. Conventional thermoforming of plastic articles from sheet material involves heat-softening the sheet; holding or gripping the sheet around the area to be formed, and stretching the heat-softened sheet out of its normally flattened condition into conformity with a mold to shape the same. While various different techniques have been evolved for controlling the stretching and hence the material distribution in the thermo-formed article, articles produced by thermoforming techniques inherently have a wall thickness which is substantially less than that of the original sheet stock. Because of the stretching and thinning of the stock during conventional thermoforming of plastic articles, any printing on the articles must be applied after the articles have been formed. Moreover, trimming of the articles is generally necessary after thermoforming, resulting in substantial scrap material at the article forming plant.

In injection molding, plastic generally in powder or pellet form, is melted and the hot melt then injected into a mold and thereafter cooled. In compression molding, the plastic material, as loose powder, pellets, or in the form of a billet or preform formed of compressed powder, is introduced into a mold, and the material subjected to a high pressure with or without the addition of outside heat, to force the plastic material throughout the mold cavity. In both injection molding and compression molding, the shape and the thickness of the different parts of the article are controlled by the shape and size of the mold cavity. While injection and compression molding do enable a wide selection of shape and wall thickness in the finished article, both techniques require relatively complicated and expensive equipment and necessitate a somewhat longer cycle time than in thermoforming of sheet plastic material. Moreover, if printing is desired on such articles, the printing can only be applied after molding of the articles has been completed.

An important object of this invention is to provide a method for forming plastic articles from thermoplastic sheet material which enables improved control over the distribution of material in the article.

Another object of this invention is to provide a method for forming plastic articles wherein the articles can be formed from a blank of sheet thermoplastic material without requiring any trimming of the articles after forming and consequently without waste or scrap at the forming plant.

Another object of this invention is to provide a method for forming plastic articles from thermoplastic sheet material which substantially avoids thinning of the sheet material during forming of cup-like articles.

Still another object of this invention is to provide a method for forming cup-shaped plastic articles from thermoplastic sheet material wherein portions of the cup-like articles such as the skirt portions have a thickness greater than the thickness of the original sheet.

A further object of this invention is to provide a method for forming cup-shaped plastic articles from sheet material wherein the portion of the sheet that forms the end face of the cup-shaped article is substantially undistorted during the forming thereof, thereby enabling undistorted printing for the end face of the article to be applied to the thermoplastic material while it is still in sheet form.

Still another object of this invention is to provide a method of forming cup-like articles such as cups, caps, etc. from sheet thermoplastic material in which the inner side of the cup-like article is essentially sterile after forming of the article.

An additional object of this invention is to provide a method for forming essentially sterile plastic articles such as caps, cups and the like from thermoplastic sheet material which utilizes relatively simple and inexpensive apparatus suitable for in-plant use at the packaging plant using the cups, caps or the like.

The method of the present invention in general involves cold-forming a piece of cold-formable thermoplastic material into the form of a dished body having a shape generally similar to the desired shape of the article, heating the dished body sufficient to at least partially soften the body, and thereafter pressing the heat-softened body into conformity with a cold article-shaping mold to shape and set the thermoplastic body. The cold-forming of the thermoplastic material is advantageously achieved by drawing a disk of the material through a drawing die in a manner to avoid wrinkles or folds, and the cold-drawn cup-like body is preferably inserted directly into a female mold which confines outward expansion of the cold-drawn body. The cold-drawn body is preferably differentially heated by directing a stream of hot gases against one side thereof, preferably the inner side, and sufficient to soften the inner side of the cold-drawn body to a greater degree than the outer side. The heat-softened body is thereafter final-formed and set by pressing the heat-softened side against a mold. This is preferably achieved by axially compressing the skirt portion of the cup-shaped body to radially expand the same into conformity with the mold. Alternatively, the skirt portion of the heat-softened body can be radially compressed to form the same.

The foregoing objects and advantages of the present invention will be more readily understood by reference to the following detailed description when taken in connection with the accompanying drawings, wherein:

FIGURE 1 is a diagrammatic view illustrating forming a blank from a sheet of cold-formable thermoplastic material;

FIG. 2 is a face view of a blank of cold-formable thermoplastic material having printing on the face of the blank in the form of a rectangular grid;

FIGS. 3 and 4 are diagrammatic views illustrating sequential steps in the cold-forming of a disk of thermoplastic material into a cup-like body and inserting the same into a female forming means;

FIG. 5 is a diagrammatic view illustrating the step of heating the cold-formed body;

FIGS. 6, 7 and 8 are diagrammatic views illustrating sequential steps in the forming of the heat-softened body into the final shape of the article;

FIG. 9 is a plan view of a cover formed by the method of the present invention;

FIG. 10 is a sectional view through the cover of FIG. 9;

FIG. 11 is a side elevational view of the cover of FIG. 9; and

FIG. 12 is a diagrammatic view illustrating a modification in the step of forming the heat-softened body into the final shape of the article.

The method of the present invention is generally adapted for forming dished or cup-like plastic articles utilizing any cold-formable thermoplasitc material. As used herein the term "cold-formable thermoplastic material" refers to any thermoplastic material which can be cold-formed at a temperature substantially below its softening temperature, and preferably at normal room temperatures, for example 60–90° F., into a shape generally similar to the desired shape of the article without fracturing or crazing the plastic. Examples of suitable cold-formable thermoplastic materials are ethylene polymers having a density of at least 0.94 g. per cc.; vinyl polymers such as those described in "Vinyl and Related Polymers" by C. E. Schildknecht, published by John Wiles & Sons, New York (1952); linear, thermoplastic polyhydroxyethers such as those described in British Patent 1,006,776; and linear, thermoplastic polyarylene polyethers, such as those described in French Pattent 1,407,301, issued July 15, 1965.

In accordance with the present method, the articles are formed from sheet thermoplastic material and, preferably, the sheet is pretrimmed or shaped to form blanks of a size and shape such that the entire blank is utilized in the subsequent formation of the cup-like article without further waste or trimming of the article after it is formed. The blanks of cold-formable thermoplastic material designated B can be formed in any suitable manner and may, for example, be formed as shown in FIG. 1 by punching or stamping a blank B from a sheet S with a conventional punch and die apparatus designated 21 and 22 respectively. The thickness of the sheet and hence the blank formed therefrom is selected in accordance with the desired thickness of the article to be formed. While the blank B is herein shown in the form of a flat disk of uniform thickness, it may be stamped or otherwise formed with a non-uniform thickness if desired to provide a different material distribution in the formed article.

In conventional thermoforming of sheet thermoplastic material, the material is first heat-softened and then stretched out of its normally flattened condition into conformity with a mold. In order to minimize stretching and thinning of the thermoplastic material as occurs in forming the same in a heat-softened condition, the disk or blank B of cold-formable thermoplastic material is first coldformed or drawn to a shape generally similar to the desired shape of the final article. As used herein, the term "cold-formed" "cold-drawn" refers to forming or drawing the thermoplastic sheet while the sheet is at a temperature substantially below its softening temperature and preferably at normal room temperature. The method is herein shown used in the formation of caps, it being understood that the method is generally adapted for use in forming dished and cup-like articles. It is generally undesirable to have folds, wrinkles or pleats in the final article and, accordingly, in drawing the cold-formable disk into a cup-like body, good draw die technique, similar to that employed in drawing cup-like bodies from metal stock, should be employed. It is to be understood, however, that any wrinkling that may occur in the cold-drawing or in the subsequent forming operation generally does not cause any significant damage to the product other than minor surface imperfections. As shown in FIG. 3, the blank B is positioned over a drawing die 25 having a die opening 26, and the periphery of the blank is held against the draw die by a pressure pad 27 yieldably biased by spring 28. A punch 29 is provided for forcing the central portion of the blank through the die opening 26 and, as diagrammatically shown in FIG. 3, the punch is supported as at 30 for axial reciprocation relative to the die 25 in alignment with the opening. In accordane with good drawing techniques, the inlet of the die opening 26 is formed with a radius as indicated at 26a, and the clearance between the punch and die opening is made at least equal to the thickness of the blank being drawn and preferably slightly greater. For example, in drawing a plastic blank formed of linear polyethylene having a thickness of .043 inch, the die opening was made 1.585 inches with a 3/64" radius, and the punch diameter was made 1.395 inches with a 5/64" radius at 29a. The pressure exerted by the springs 28 on the pressure pad 27 is so selected that the pad holds the blank B on the outer margin as the punch moves through the die opening and the blank irons itself over the radiused inlet edge 26a in the die opening. For deeper draws, it is, of course, possible to use a multiple drawing technique wherein the workpiece is subjected to successive and progressively deeper draws, all in a manner well understood in metal drawing techniques. The cold-drawn body as shown in FIG. 4 includes a central portion designated $B_1$ and an annular skirt portion $B_2$. In general, the central portion $B_1$ after drawing has a thickness approximately the same as the thickness of the original blank B, and the skirt portion $B_2$ is only slightly thinner in the region adjacent its juncture with the central portion, due to the small stretching of the material which occurs during the drawing operation.

The cold-formable thermoplastic material, after cold-forming or drawing into a cup-like body, tends to partially spring back due to the elastic memory of the plastic and, accordingly, the cup-like body after being cold-drawn, must be radially confined to hold it in shape. For this purpose, the cold-drawn body is preferably pressed directly into a female forming means indicated at 31. The female forming means radially confines the cold-formed body and the spring-back action of the cold-formed body tends to hold the thermoplastic body in the female forming means for support by the latter during the subsequent heating and forming operations. For the reasons pointed out hereinafter, the female forming means preferably includes a plug member 32 having a face 33 shaped to engage the outer face of the central portion $B_1$ of the cold-formed body, and an annular ring portion 34 which surrounds the skirt portion $B_2$ of the cold-formed body and defines a female mold cavity C with the plug member. The ring member 34 is preferably supported for movement relative to the plug member 32 to enable subsequent forming of the skirt portion of the thermoplastic body and, in the form shown in FIGS. 3–8, is movable in a direction axially of the mold cavity. The ring member 34 is yieldably urged to a position as shown in FIG. 4 in which the lower edge of the ring member is spaced below the face 33 a distance at least equal to and preferably slightly greater than the depth of the skirt portion $B_2$ of the cold-formed body so that the depth of the mold cavity C at least equals and preferably slightly exceeds that of the cold-drawn body. As shown, springs 36 are interposed between the ring member and a flange 37 on the plug, and studs 38 are threaded into the ring member and extend through openings in the flange with the heads on the studs adjusted to engage the flange when the ring member reaches the position shown in FIG. 4. The ring member is thus yieldably movable upwardly relative to the plug member for reasons described hereinafter.

The drawing punch 29 is preferably normally urged to a retracted position below the drawing die 25 and, for this purpose, a spring 41 is interposed between the drawing die and a head 42 associated with the punch 29. Any suitable and conventional press means may be used for actuating the drawing die punch 29 and, as diagrammatically shown, the plug 32 of the female molding means is adapted to be held in fixed relation as against an abutment indicated at 44, and a means such as a ram 45 is provided for moving the punch head 42 upwardly. During the initial upward movement of the punch head, the spring 41 raises the drawing die 25 until it engages the end of the ring member 34. Continued upward movement of the ram compresses the spring 41 and raises the punch 29, thereby drawing the blank B through the die opening 26 and forcing the cup-like body directly into the female mold cavity C. The stiffness of the spring 41 is substantially less than the combined stiffness of the springs 36 and is just sufficient to snugly hold the die 25 against the female molding means when the ram is actuated, but without causing significant movement of the ring member 34 relative to the plug member 32.

As previously discussed, the stresses in the cold-drawn body are such as to tend to cause the same to radially expand and partially return to its initial condition. The cold-drawn body is, in accordance with the present invention, subjected to a subsequent thermoforming operation to impart the desired final shape and form to the article. The cup-shaped body is heated sufficient to partially soften the same to both partially relieve the stresses built up during the cold-forming operation and to enable subsequent final shaping of the article. The body is heated while the skirt portion is confined against radial expansion and, preferably, the cup-shaped body is heated while confined and supported in the female forming means 31. It is preferable to differentially heat the cold-formed body with the inner side being heated to a greater degree than the outer side and, preferably, the inner side is heated to a temperature above its softening temperature while the outer side of the body is maintained at a somewhat lower temperature, preferably below its softening temperature, to avoid sticking to the female forming means. The female forming means is maintained, as by the circulation of a fluid through passageways 48, at a temperature substantially below the softening temperature of the thermoplastic material. The passageways are connected as through conduits 49 and 50 to a coolant source such as a tank T of fluid which is maintained as by a temperature controlled heat exchange means E at a temperature within a preselected range substantially below the softening temperature of the thermoplastic material. A means such as a pump P may be employed to circulate the fluid from the tank through the female forming means to maintain the temperature of the female forming means below the softening temperature of the thermoplastic material. For example, for high density polyethylene which begins to soften at about 275° F., the temperature of the female molding means was maintained at about 125° to 130° F., which is well below the softening temperature of that thermoplastic material.

In order to heat-soften only the inner side and minimize the tendency to soften the outer side of the cup-shaped body due to heat conduction therethrough, the heating is preferably effected with a high intensity heat source such as a flame indicated at 51 produced by a burner 52. In the forming of thermoplastic articles from sheet polyethylene having a thickness of .043 inch, a flame temperature of approximately 1500° F. was used and the flame was applied to the inner side of the cup-shaped body for about one or two seconds to produce a rapid heating of the inner side of the cup-shaped body to a temperature above its softening temperature to soften the inner side. The heat applied to the inner side of the body is slowly conducted through the body toward the outer side. However, the cold female forming means tends to cool and prevent excessive softening of the outer side of the body. In the apparatus used, the cold-formed body was retained in the female forming means due to the spring-back action of the cold-formed cup, and heating of the inner side of the body with the above-described high intensity flame produced softening of the inner side of the body without softening the outer side sufficient to allow the cup to release and drop out of the female mold means within the 3- to 4-second time between the heating and the subsequent forming step.

After heat-softening of the inner side of the cold-formed body, and while the inner side is still in a heat-softened condition, the body is pressed between male and female forming means which set the heat-softened body and preferably produce a further shaping of the same. The body having the heat-softened inner side can merely be set in a shape substantially similar to the initial cold-drawn shape by inserting a cold male-forming member having a shape substantially the same as the inside of the cold-drawn member. This would produce a cup-like body having a generally uniform material distribution achieved by the initial cold-forming operation and which, due to the heat-softening and subsequent cold-setting, would substantially retain the shape imparted thereto. However, since the inner side of the cold-formed body is heat-softened, the body can be reshaped to more intricate shapes than can be achieved in the cold-forming operation.

While the method is generally adapted for use in forming cup-like bodies, it is herein shown applied in the formation of internally threaded caps or covers. In the formation of such covers, it is desirable for reasons pointed out hereinafter, to maintain the central portion $B_1$ in a generally undistorted condition while the skirt portion is reformed to make internal threads. In the preferred embodiment illustrated in FIGS. 6–11, the central portion $B_1$ of the cup-like body is clamped or compressed to set and cool the same while the skirt portion is axially compressed to radially expand the same into conformity with the male and female forming means. This produces a cap having a generally undistorted top with a thickened rim or flange portion. Alternatively, the flange or skirt portion of the body can be radially compressed between the male and female forming means to shape the same.

The forming of cup-shaped articles such as caps having a thickened rim is illustrated in FIGS. 6–8. In the preferred method, a male forming means is first inserted into a heat-softened body and the skirt portion of the body is thereafter axially compressed to radially expand the same into conformity with the male and female forming means. The male forming means is arranged to shape the inner heat-softened side of the body and, when forming internally threaded caps, the male forming means is in the form of a member 61, commonly referred to as a thread plug, having thread forming grooves 61a in the outer surface thereof. In order to inhibit distortion of the central portion $B_1$ of the body during final forming of the same, it is preferable to form the male forming member with a flat end face 61b and to move the male forming member into the body until the end face 61b engages the inner heat-softened side of the central portion of the body to clamp the same to the face 33 of the plug member 32, before reshaping the flange. The skirt portion of the heat-softened body is thereafter axially compressed by a skirt compressing member 62 which engages the end of the skirt portion $B_2$.

While the skirt compressing member 62 can be shaped to telescope into the cavity C in the female forming means to axially compress the skirt portion $B_2$ of the body, less flashing occurs if the end of the cavity is closed around the plug member and the cavity itself then telescopically shortened. For this purpose, the skirt compressing member 62 is supported for axial movement relative to the male forming member 61 and is formed with an end face 62a extending outwardly from the male forming member 61 to a diameter larger than that of the cavity C. The end face is thus arranged to close the end of the cavity C and to engage the ring portion 34 in the female forming means when pressed thereagainst, as shown in FIG. 7, and to raise the ring portion during axial compression of the skirt on the thermoplastic body, as shown in FIG. 8.

Any suitable arrangement may be used for moving the male forming member into the heat-softened thermoplastic body and for thereafter moving the skirt compression member relative to the male forming member to sequentially close the end of the cavity C and thereafter axially compress the skirt portion of the body. As shown, the female forming means is held against upward movement as by the aforementioned fixed abutment 44 and the male forming member is mounted on a vertically movable head or bolster 63 which is elevated and lowered as by a ram (not shown). The ram may be connected, either directly or indirectly through a force multiplying apparatus, to a rod 64 that engages the head 63 and, as shown, the rod is guided in a stationary guide 64a. The skirt compression member 62 is conveniently moved relative to the male forming member by a ram 65, herein shown mounted on the head or bolster 63, and having a piston or pistons 65a connected through rods 65b to the member 62. Any suitable means, either manual or automatic, may be provided for sequentially operating the ram that elevates the male forming member 61 and the ram 65 that elevates the skirt compression member, to sequentially elevate the male forming member 61 into the body until the end face 61b engages the inner side of the body; raise the skirt compressing member 62 until it closes the end of the cavity; and thereafter press the male forming member and skirt compressing member upwardly with sufficient thrust to compress the skirt portion $B_2$ and cause the same to radially expand until it fills the space including the thread grooves between the male and female forming means. Since the thermoplastic body is only partially heat-softened, the pressures necessary to properly re-form the thermoplastic material are relatively high, generally as high or higher than pressures customarily used in compression molding that thermoplastic material. For example, in forming articles from high density polyethylene, the forces applied to the male forming member and to the skirt compression member were selected to produce pressures of about 5000 p.s.i. on the thermoplastic body.

The male molding means is also preferably maintained at a temperature below the softening temperature of the thermoplastic material to set the heat-softened plastic, and for this purpose is formed with a coolant passage 71 which is connected as through conduits 72 and 73 to the coolant source T. As previously described, a temperature controlled heat exchange E regulates the temperature of the coolant to maintain the temperature of the male forming member substantially below the softening temperature of the thermoplastic material.

When cup-like bodies having a generally flat central portion are formed by the method described above, the blanks can be preprinted while in a flattened condition, at least in the area which forms the central portion of the thermoplastic article, without causing distortion of the printing during the subsequent forming steps. The cold-drawing or cold-forming step produces very little stretching or deformation of the part $B_1$ of the blank that forms the central portion $B_1'$ of the cover, and the subsequent step of heating the inner side of the cover similarly does not produce any distortion or obliteration of printing on the outer face of the central portion. During the final forming step as described above, the central portion is clamped to the plug portion 32 of the female forming means so as to prevent deformation of the central portion during reshaping of the skirt portion. As a result, very little distortion occurs in the part $B_1$ of the blank that forms the central part $B_1'$ of the completed article. The blank may be printed using known techniques and materials for printing on plastic, and the printing of the blank can be effected either by printing on the sheet from which the blank is formed or by printing on the individual blanks. FIG. 2 illustrates a blank which has been preprinted with a rectangular grid-like design designated g, and FIGS. 9 and 11 are top and side views of a cap made from a blank preprinted with such a grid-like design. The blank of FIG. 2 is on one-half the scale of the cap of FIG. 9. In FIGS. 9 and 11, and as shown in FIGS. 9 and 11, the grid-like printing remains substantially undistorted on the top $B_1'$ of the cap, while the printing on that area of the blank that forms the skirt portion $B_2'$ undergoes substantial distortion. From this it will be seen that the area of the blank which forms the central portion $B_1'$ of the cup-shaped article can be preprinted and the printing will not be distorted during the subsequent forming operations. The printing ordinarily should not be extended to the area which forms the skirt portion $B_2'$ of the cup-like body, unless deformation of the printing in this area is not objectionable. However, since the deformation in the skirt portion is generally symmetrical and is generally similar in successively formed articles, the entire blank can be preprinted, if desired, in such a manner that the preprinting on the central portion of the blank is undistorted while the preprinting on the area that forms the skirt is distorted generally opposite to that which occurs during forming of the article. As illustrated in FIG. 10, the central portion $B_1'$ of the cup-shaped body or cap dishes inwardly somewhat from the flat shape imparted by the mold, while the sides or skirt $B_2'$ of the body are arched slightly as viewed in section. This is considered to be caused by the stresses produced in the outer surface portion of the thermoplastic body during axial compression of the same. The outer surface of the skirt is below the softening temperature and, during axial compression of the skirt, the outer surface is essentially cold-pressed into shape. When the formed article is removed from the mold, the outer skin grows due to its memory, thereby creating the curves at the sides which in turn push the top inwardly.

In some applications wherein the thickened rim portion is not required, or where it is desired to use very thin stock that could not be readily compressed in an axial direction, it is possible to radially compress the skirt portion into conformity with the male mold. As diagrammatically shown in FIG. 12, the female molding means designated 31' is of the radially compressible or collet type, as contrasted to the axially compressible female molding means of the preceding embodiment. As in the preceding embodiment, a blank of cold-formable thermoplastic material is cold-drawn into a generally cup-like shape; pressed into the cavity C' formed by the female molding means, and the inner side heated sufficient to soften the same. A male molding member 61' is then moved axially inwardly as indicated by the arrow a to engage the inner side of the central portion of the preformed body, and the collet members 34' of the female molding means are then pressed radially inwardly, as indicated by the arrows b to radially compress the skirt portion of the body into conformity with the male mold. As is conventional in molding screw-type caps, the molded cap is either unthreaded or "jumped" from the plug after completion of the molding operation. This can be effected either manually or by known automatic apparatus.

As will be apparent, the female forming means 31 could be located at one station and the cold-forming die 25; the burner 52, and the male forming means 61 successively moved to positions below the female forming means to perform the sequential cold-forming, heating and final-forming steps. Alternatively, the female forming means could be moved successively past the die, burner and male forming means.

EXAMPLE

A blank B was formed from high density polyethylene of the type designated DGDA–3451 manufactured by Union Carbide Corporation and having a density of .94 grams per cc. The blank had a thickness of .043 inches and was die-cut to $2^{25}\!/_{64}$ inches in diameter. The blank was then cold-drawn into a cup-like form and pressed into the female molding cavity. In order to minimize wrinkling of the material during drawing through the die 25, a moderate pressure pad force of the order of 75 pounds was used. The punch was formed with an O.D. of 1.35 inches and having a $5\!/_{64}$ inch radius while the die I.D. was 1.585 inches with a $5\!/_{64}$ inch radius. The internal dimension of the female mold cavity was made slightly larger than the I.D. of the forming die to facilitate transfer of the cold-drawn body into the mold cavity.

The inner side of the cold-formed body was thereafter heated, utilizing a flame calibrated at approximately 1500° F., and the flame was applied to the thermoplastic body for about one to two seconds, sufficient to heat the inner side above the softening or melting temperature of that material, viz. to a temperature of about 300–325° F. The mold cavity and plug were maintained at a temperature substantially below the softening of the thermoplastic and of the order of 125° to 130° F.

The mold cavity C had an inner diameter of about 1.6″ and the male forming member 61 had a diameter of about 1.475″, so that the male forming member was smaller than the cavity by an amount greater than twice the .043″ thickness of the original blank. In the final molding operation, the male molding member was first moved into the body until the end face 61b touched the bottom of the central portion $B_1$ and immediately thereafter the compression ring 62 was moved upwardly to close the bottom of the mold cavity. The forces applied to the male molding member 61 were then increased to about 8500 pounds' thrust while the forces applied to the compression ring 62 were simultaneously increased to about 1800 pounds' thrust. The springs 36 on the female molding means exerted about 275 pounds' thrust which opposed the thrust on the compression ring and the net thrust on the compression ring acting on the annular area between the male molding member 61 and the inner wall of the cavity C produced a pressure of about 5000 p.s.i., about the same as the pressure applied to the central portion $B_1$ of the body by the 8500 pounds of thrust applied to the 1.475″ diameter male forming member.

It will be understood that the foregoing description and drawings are only illustrative of the present invention, and it is not intended that the invention be limited thereto.

What is claimed as new is:

1. A method of forming dished articles from cold-formable thermoplastic material comprising, cold-drawing a solid flat sheet of cold-formable thermoplastic material into the form of a dished body having a central portion and a skirt portion shaped generally similar to the desired shape of the article, radially confining the cold drawn dished body against outward expansion to hold its shape, heating only the inner side of the dished body with a high intensity heat source for a brief time sufficient to only soften the inner side of the body, and promptly thereafter pressing the heat-softened body into conformity with a cold article shaping mold to shape and cool the body.

2. The method of claim 1 including the step of printing on the sheet at the side that forms the outer side of the dished body prior to cold-forming the sheet into the dished body.

3. The method of claim 1 wherein heating is effected by directing a stream of hot gases against the inner side of the dished body to heat-soften the inner side.

4. A method of forming dished articles from cold-formable thermoplastic material comprising, cold-drawing a disk of cold-formable thermoplastic material into a dished body having a central portion and a skirt portion, radially confining the cold-drawn dished body against outward expansion to hold its shape, heating only the innerside of the dished body with a high intensity heat source for a brief time sufficient to only heat-soften the inner side of the skirt portion, and promptly thereafter axially compressing the heat-softened skirt portion while radially confining the skirt portion between cold inner and outer mold members to radially expand the skirt portion into conformity with the inner and outer mold members to shape the skirt portion and cool the same below the softening temperature thereof.

5. The method of forming dished articles from cold-formable thermoplastic material comprising, cold-drawing a disk of cold-formable thermoplastic material into a dished body having a central portion and a skirt portion, engaging the outer side of the skirt portion of the cold-drawn dished body to confine outward expansion of the skirt portion, heating the inner side of the dished body with a high intensity heat source for a brief time sufficient to only soften the inner side of the skirt portion of the body, and promptly in succession thereafter positioning an inner mold member inside the heat-softened skirt portion, and pressing the skirt portion of the dished body while the inner side thereof is in a heat-softened condition into conformity with said inner mold member.

6. The method of claim 5 wherein said skirt portion of the dished body is pressed into conformity with the inner mold member by axially compressing the heat-softened skirt portion to radially thicken the same.

7. The method of claim 5 wherein said heat-softened skirt portion is pressed into conformity with the inner mold member by radially compressing the heat-softened skirt portion.

8. The method of forming dished articles from cold-formable thermoplastic material comprising, pressing a sheet of cold-formable thermoplastic material at a temperature substantially below its softening temperature into a female forming means to form a dished body of said thermoplastic material having a shape generally similar to that of the female forming means, heating the inner side of the dished body of thermoplastic material while in the female forming means with a high intensity heat source for a brief time sufficient to only soften said inner side, and promptly in succession thereafter inserting a cold male forming means into the inner heat-softened side of the dished body, and compressing the body while the inner side is in a heat-softened condition between the male and female forming means to shape and cool the body.

9. The method of claim 8 including the step of pre-printing the sheet of thermoplastic material at the side thereof which forms the outer side of the dished body prior to pressing the same into the female forming means.

10. The method of claim 8 wherein the sheet of cold-formable thermoplastic material is pressed completely through a drawing die and directly into the female forming means during cold-forming of the dished body.

11. The method of claim 8 including maintaining the female forming means at a temperature below the heat-softening temperature of the thermoplastic material to inhibit softening of the outer side of the dished body.

12. The method of forming dished articles from cold-formable thermoplastic material comprising, cold-drawing a disk of cold-formable thermoplastic material into a dished body having a central portion and a skirt portion and positioning the dished body in an outer mold member to radially confine the cold-drawn dished body and hold its shape, heating the inner side of the dished body with a high intensity heat source for a brief time sufficient to only soften the inner side of the skirt portion of the body, promptly thereafter positioning an inner mold member inside the dished body, and axially compressing the skirt portion to radially thicken the same.

13. The method of claim 12 including gripping the central portion of the dished body between the inner and outer mold members before axially compressing the skirt portion.

14. The method of forming threaded caps from a cold-formable thermoplastic material comprising, cold-forming a sheet of cold-formable thermoplastic material into a dished body having a central portion and a skirt portion, radially confining the cold-drawn dished body against outward expansion to hold its shape and heating the inner side of the dished body with a high intensity heat source for a brief time sufficient to only soften the inner side of the skirt portion, and promptly in succession thereafter inserting an externally threaded member into the dished body, and pressing the skirt portion while the inner side is in a heat-softened condition into conformity with the externally threaded member.

15. The method of claim 14 wherein the skirt portion is pressed into conformity with the externally threaded member by axially compressing the skirt portion while confining the outer side of the skirt portion against outward expansion.

16. The method of forming dished articles from cold-formable thermoplastic material comprising, cold-drawing a sheet of cold-formable thermoplastic material into a dished body having a central portion and a skirt portion and positioning the cold-drawn body in a female forming means having a plug engaging the outer face of the central portion of the dished body and a ring surrounding the skirt portion of the dished body and projecting axially from the plug at least to the free edge of the skirt portion to radially confine the body, heating the inner side of the dished body while in the female forming means with a high intensity heat source for a brief time sufficient to only soften the inner side, and promptly in succession thereafter positioning a male forming member in the dished body with the male forming member engaging the inner side of the central portion of the dished body, closing the space between the end of the ring member and the male forming member with a cavity closing member and the ring member in unison relative to the male forming member and plug respectively in a direction toward the plug to axially compress the skirt portion of the body and thereby radially expand the same between the ring member and the male forming means.

References Cited

UNITED STATES PATENTS

| 2,120,328 | 6/1938 | Ferngren | 264—92 |
| 2,885,105 | 5/1959 | Heyl | 264—230 XR |
| 3,298,893 | 1/1967 | Allen | 264—92 XR |
| 3,331,906 | 7/1967 | Adams | 264—292 |

FOREIGN PATENTS

| 768,056 | 9/1967 | Canada. |
| 1,372,728 | 8/1963 | France. |

ROBERT F. WHITE, Primary Examiner

R. R. KUCIA, Assistant Examiner

U.S. Cl. X.R.

264—292, 296, 322, 327